United States Patent
Esam

(10) Patent No.: US 10,037,386 B1
(45) Date of Patent: Jul. 31, 2018

(54) DATA REPLICATION OPTIMIZATION FOR ONLINE SOCIAL NETWORK CLOUD COMPUTING

(71) Applicant: EMC Corporation, Hopkinton, MA (US)

(72) Inventor: Mohamed Esam, New Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 193 days.

(21) Appl. No.: 15/222,499

(22) Filed: Jul. 28, 2016

Related U.S. Application Data

(63) Continuation-in-part of application No. 14/138,756, filed on Dec. 23, 2013, now Pat. No. 9,507,829.

(60) Provisional application No. 62/365,783, filed on Jul. 22, 2016.

(51) Int. Cl.
G06F 17/30 (2006.01)

(52) U.S. Cl.
CPC ............. G06F 17/30899 (2013.01)

(58) Field of Classification Search
None
See application file for complete search history.

(56) References Cited

U.S. PATENT DOCUMENTS

| | | |
|---|---|---|
| 2008/0172288 A1 | 7/2008 | Pilskalns et al. |
| 2009/0217178 A1 | 8/2009 | Niyogi et al. |
| 2010/0011366 A1 | 1/2010 | Gerovac et al. |
| 2010/0115216 A1 | 5/2010 | Jia et al. |
| 2010/0131545 A1* | 5/2010 | Srivastava ........ G06F 17/30575 707/769 |
| 2011/0276649 A1 | 11/2011 | Pujol et al. |
| 2012/0173486 A1 | 7/2012 | Park et al. |
| 2012/0226748 A1 | 9/2012 | Bosworth et al. |
| 2012/0317142 A1 | 12/2012 | Broecheler et al. |
| 2016/0011944 A1* | 1/2016 | Jain ................ G06F 11/1402 707/674 |

OTHER PUBLICATIONS

K. Nguyen et al., "Preserving Social Locality in Data Replication for Online Social Networks," 31st International Conference on Distributed Computing Systems Workshops, Jun. 2011, pp. 129-133.

(Continued)

*Primary Examiner* — James Trujillo
*Assistant Examiner* — Aida Z Tessema
(74) *Attorney, Agent, or Firm* — Ryan, Mason & Lewis, LLP

(57) ABSTRACT

Systems and methods are provided for optimizing data storage allocation and replication of user data in computing systems. For example, a method includes determining a ranking of each data center in the computing system for a given user of the computing system, and selecting a first data center to store a primary copy of user data, and a second data center to store a replica copy of the user data, based at least in part on the determined rankings of the data centers for the given user. The data centers are ranked using a ranking function which includes an access ratio that is determined as ratio of (i) a number of times that each of a total number of users in the given data center have accessed shared data of the given user to (ii) a number of data uploads that the given user has made to the computing system.

20 Claims, 5 Drawing Sheets

(56) References Cited

OTHER PUBLICATIONS

G. Liu et al., "Selective Data Replication for Online Social Networks with Distributed Datacenters," 21st IEEE International Conference on Network Protocols (ICNP), Oct. 2013, 10 pages.

Y. Huang et al., "Differentiating Your Friends for Scaling Online Social Networks," IEEE International Conference on Cluster Computing (CLUSTER), Sep. 2012, pp. 411-419, Beijing, China.

A. Lakshman et al., "Cassandra—A Decentralized Structured Storage System," ACM SIGOPS Operating Systems Review, Apr. 2010, pp. 35-40, vol. 44, No. 2.

developers.google.com, "Frequently Asked Questions," https://developers.google.com/speed/public-dns/faq#countries, May 26, 2016, 13 pages.

A. Adya et al., "FARSITE: Federated, Available, and Reliable Storage for an Incompletely Trusted Environment," USENIX Association, Proceedings of the 5th Symposium on Operating Systems Design and Implementation (OSDI), Dec. 2002, 14 pages.

D.B. Terry et al., "Managing Update Conflicts in Bayou, a Weakly Connected Replicated Storage System," Proceedings of the 15th ACM Symposium on Operating Systems Principles (SOSP), Dec. 1995, pp. 172-183, vol. 29, No. 5.

G. Decandia et al., "Dynamo: Amazon's Highly Available Key-Value Store," Proceedings of the 21st ACM Symposium on Operating Systems Principles (SOSP), Oct. 2007, pp. 205-220, vol. 41, No. 6.

D.A. Tran et al., "S-CLONE: Socially-Aware Data Replication for Social Networks," Computer Networks: The International Journal of Computer and Telecommunications Networking, May 2012, pp. 2001-2013, vol. 56, No. 7.

\* cited by examiner

DATA REPLICATION OPTIMIZATION FOR ONLINE SOCIAL NETWORK CLOUD COMPUTING

CROSS-REFERENCE TO RELATED APPLICATIONS

This application claims priority to U.S. Provisional Patent Application No. 62/365,783, filed on Jul. 22, 2016, the disclosure of which is incorporated herein by reference. This application is a Continuation-in-Part of U.S. patent application Ser. No. 14/138,756, filed on Dec. 23, 2013, which is commonly assigned and incorporated herein by reference.

FIELD

The field relates generally to data storage systems and, more particularly, to systems and methods for data storage allocation and replication in cloud computing networks.

BACKGROUND

In recent years, there has been an exponential growth in the use of various online social network applications such as Facebook, Twitter, Flickr, YouTube and Blogger, for example. In general, social network applications are implemented using a computing system that is capable of serving millions of users at a given time using thousands of clustered compute nodes (servers) located within data centers that reside in various geographical locations around the world. Various industries such as media channels, political agencies, sports clubs, advertisement agencies and online gaming businesses, for example, rely on social networks to communicate with their audience and to obtain user information. One primary consideration for data storage scaling of online social networks is the ability to optimally allocate and manage user data (e.g., user feeds, status, pictures, videos, files, articles, gaming data, etc.) in storage nodes within the data centers to thereby reduce access time and minimize the costs of storage and intra-cluster communication. With social network applications, users will access their own data, as well as interact with and access the data of other users. Accordingly, the scope of user interactions in social networks poses significant challenges to optimizing data allocation.

SUMMARY

Embodiments of the invention generally provide systems and methods for optimizing data storage allocation and replication of user data in computing systems. In one embodiment of the invention, a method includes storing user data in a plurality of data centers of a computing system, and performing a storage allocation and replication process to optimize storage of the user data in the data centers of the computing system. The user data includes shared data that is shared between users of the computing system. The storage allocation and replication process includes determining a ranking of each data center in the computing system for a given user of the computing system, and selecting a first data center to store a primary copy of user data of the given user, and selecting a second data center to store a replica copy of the user data of the given user, based at least in part on the determined rankings of the data centers for the given user. For example, the highest ranked data center can be selected to store the primary copy of the user data of the given user, and the second highest ranked data center can be selected to store the replica copy of the user data of the given user. The step of determining a ranking includes ranking a given data center as a function of an access ratio that is determined as a ratio of (i) a number of times that each of a total number of users in the given data center have accessed shared data of the given user to (ii) a number of data uploads that the at least one user has made to the computing system.

In another embodiment of the invention, the process of ranking a given data center further includes dividing the access ratio by a total number of users having user data stored in the given data center.

In yet another embodiment of the invention, the computing system is a social network application, wherein the storage allocation and replication process is used to optimize the storage allocation and replication of user data in data centers of the social network to thereby minimize an average delay that users experience when accessing and reading data (e.g., pictures, posts, feeds, etc.) that is shared by their friends in the social network.

These and other embodiments of the invention will be described in further detail in the following detailed description of illustrative embodiments, which is to be read in conjunction with the accompanying drawings.

DETAILED DESCRIPTION

Figure 1:
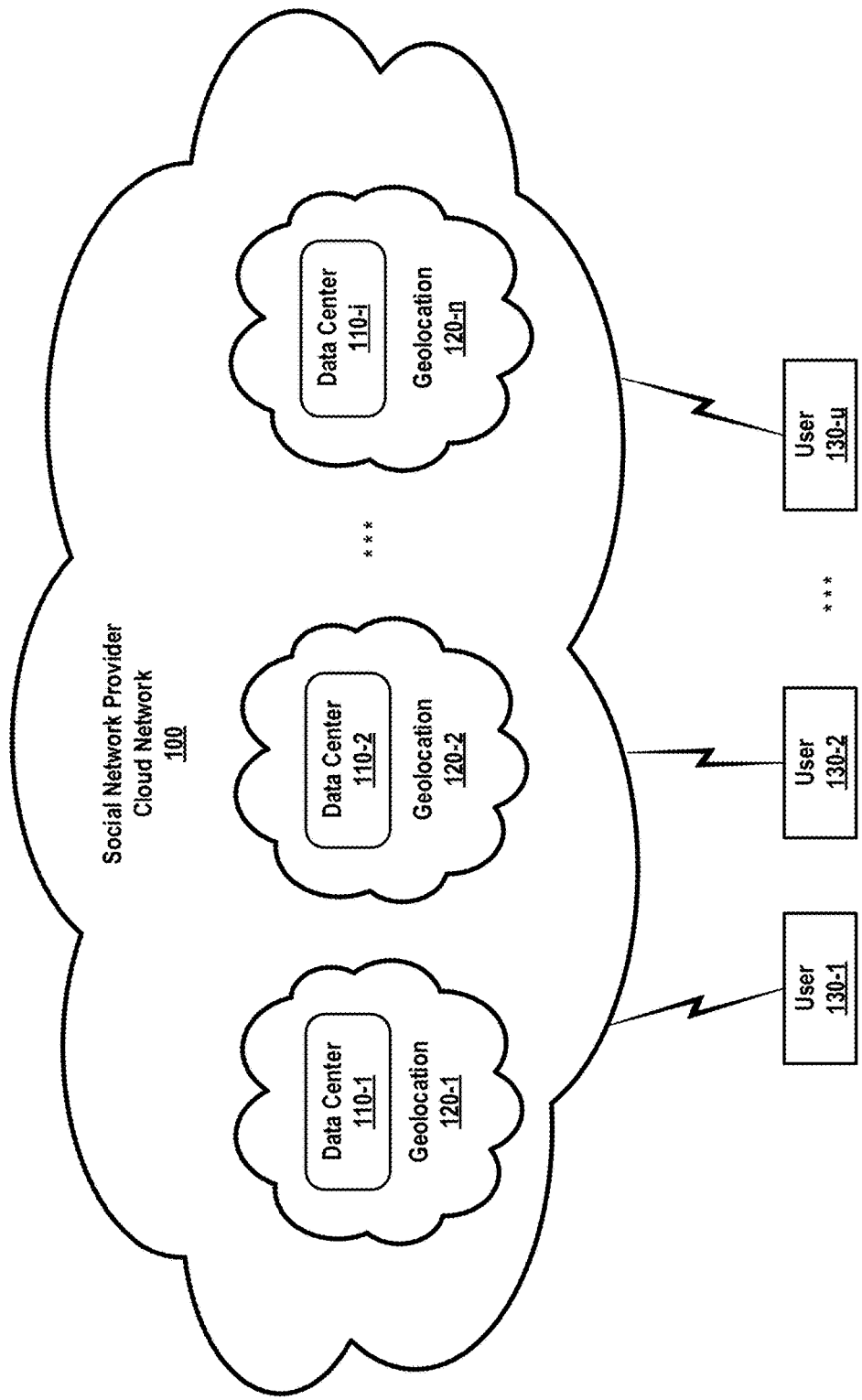
FIG. 1 illustrates a cloud computing environment in which techniques are implemented for optimizing storage allocation and replication of user data in data centers of a social network, according to an embodiment of the invention.

Embodiments of the invention as discussed herein generally include systems and methods for optimizing data storage allocation and replication of user data in computing systems. For example, illustrative embodiments of the invention include systems and methods to optimize the storage allocation and replication of user data in data centers of a social network to thereby minimize an average delay that users experience for accessing and reading the online data (e.g., pictures, posts, feeds, etc.) of other users in the social network. In one embodiment, storage allocation and replication is realized by utilizing a ranking function to rank available data centers of a social network provider on a per user basis, and then selecting, for each user, a data center having a highest ranking to store a primary copy of that user's uploaded data, and one or more next highest ranking data centers to store replica copies of the user data. The primary and replica copies of the user's data are assigned to high-ranking data centers in a manner that minimizes the time for accessing the user's data by other users (e.g., friends) in the social network. As discussed in further detail below, in one embodiment of the invention, a ranking function is based on various parameters including, for example, user location, a user's friendship matrix, locations of the user's friends, a rate or frequency or number of times that the user's data is accessed by other users, and/or other parameters.

The term "social network" as used herein generally refers to an online community of people who use a Web site, online service, or other types of computing systems to communicate with each other and share information, data, resources, etc. The term "social network" also refers to the Web site or online service that facilitates such communication. Some common examples of "social networks" include, but are not limited to, Facebook, Twitter, Flickr, YouTube and Blogger.

The term "friend" with regard to a given user generally refers to another user who is authorized, either expressly or impliedly or by default, to access the data, information, resources, etc., of the given user. For instance, in the context of the social network Facebook, the term "friends" denotes individuals who have mutually agreed to allow each other to view information on each other's profile, and follow each other's postings, and post on each other's wall, etc. One user may request another user to be a "friend," but the other user must accept the request, thereby requiring authorization for accessing/sharing user data. On the other hand, a social network such as YouTube generally allows one user to view uploaded video content of another user without specific authorization (i.e., the uploaded user content is publically available for access by other users of YouTube).

Moreover, the term "data center" as used herein generally refers to a facility that houses computer systems and associated components, such as application servers and storage systems. In particular, a "data center" is a facility that houses various equipment, such as computers, servers (e.g., web servers, application servers, database servers), switches routers, data storage devices, load balancers, wire cages, vaults, racks, and related equipment. Data centers are used to store, manage, process, and exchange digital data and information, and provide application services or management for various data processing, such as web hosting internet, intranet, and information technology.

Furthermore, the term "computing system" as used herein with respect to various embodiments is intended to be broadly construed, so as to encompass, for example, a private or public computing system (e.g. cloud computing system, online social network), or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, any application that implements a data storage system, or combination of data storage systems, including, but not limited to storage area network (SAN) systems, direct attached storage (DAS) systems, Hadoop Distributed File System (HDFS), as well as other types of data storage systems comprising clustered or distributed virtual and/or physical infrastructure.

FIG. 1 illustrates a cloud computing environment in which techniques are implemented for optimizing storage allocation and replication of user data in data centers of a social network, according to an embodiment of the invention. In particular, FIG. 1 illustrates a cloud computing network 100 of a social network provider (or social network provider network 100), which comprises a plurality (i) of data centers 110-1, 110-2, ..., 110-$i$ that are located in a plurality (n) of different geographic locations (geolocations) 120-1, 120-2, ..., 120-$n$, within the cloud computing network 100. FIG. 1 further illustrates a plurality (u) of social network users 130-1, 130-2, ..., 130-$u$, which can access the social network provider network 100 and upload their own data or otherwise access the data of other users, which is stored in storage servers within the data centers 110-1, 110-2, ..., 110-$i$.

The geolocations 120-1, 120-2, ..., 120-$n$ shown in FIG. 1 generically represent n different geographic locations in which the data centers 110-1, 110-2, ..., 110-$i$ of the social network provider network 100 reside. The geolocations 120-1, 120-2, ..., 120-$n$ shown in FIG. 1 may represent different continents of the world, different countries, different regions within a given continent, different regions within a given country, etc., or any combination thereof. The number (i) of data centers may or may not be the same as the number (n) of different geolocations shown in FIG. 1. For instance, the geolocation 120-1 may represent a country (e.g., the United States), which may have one data center 110-1, or more than one data center located in different sub-geolocations within the given geolocation 120-1. However, for ease of illustration, FIG. 1 shows one data center per geolocation (i.e., i=n). Moreover, it is to be understood that the plurality of users 130-1, 130-2, ..., 130-$u$ shown in FIG. 1 represents the population (at any given time) of total number (u) of social network users which access the social network provider network 100. Moreover, the plurality of users 130-1, 130-2, ..., 130-$u$ represent different users that reside within or near the various geolocations 120-1, 120-2, ..., 120-$n$ shown in FIG. 1.

Typically, an online social network (OSN) provider (such as Facebook) has well established data centers that are distributed around the world to cover worldwide users. For example, a user in Berlin may have friends in Berlin, friends in Australia, and friends in the United Sates, where most of the user's friends may reside in one of the locations (e.g., the United States). While the closest data center (of the service provider) to the user may be in Sweden, for example, other data centers can exist in the United States and Berlin. In an OSN, the data uploaded by a user is read/accessed primarily by the user's friends. In this regard, in accordance with embodiments of the invention, techniques are provided to determine an optimal data center in which to locate the user's data in order to minimize the average read/access delay of such user data by friends of the user, as well as determine one or more optimal data centers for distributing replica copies of such user data across the OSN data centers to minimize the average read/access delay of such user data by friends of the user.

Figure 2:
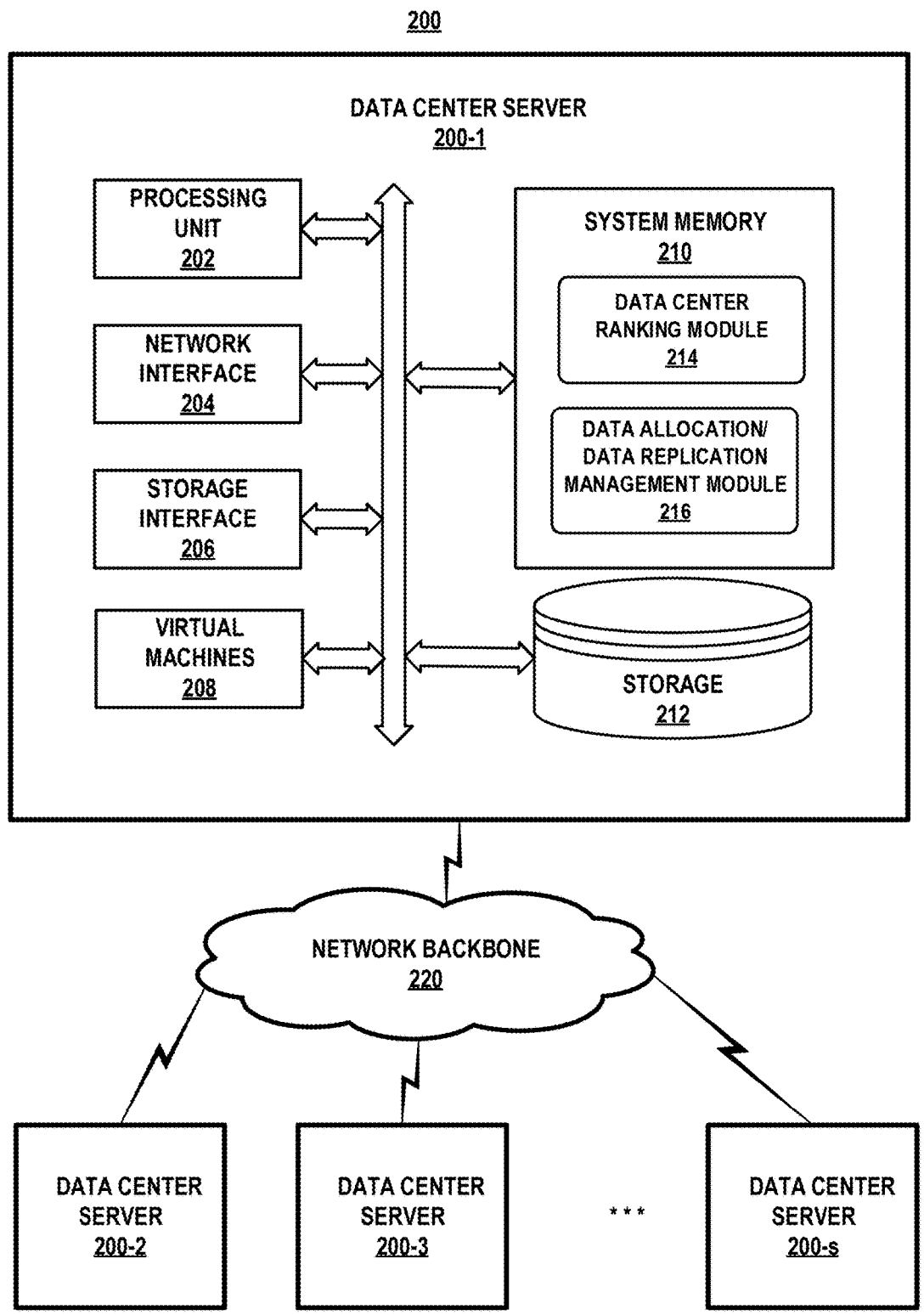
FIG. 2 illustrates a computing system which implements methods for optimizing storage allocation and replication of user data in data centers of a social network, according to an embodiment of the invention.

FIG. 2 illustrates a computing system which implements methods for optimizing storage allocation and replication of user data in data centers of a social network, according to an embodiment of the invention. In particular, FIG. 2 illustrates a computing system 200 which can be utilized to implement the social network provider network 100 of FIG. 1. The computing system 200 comprises a plurality (s) of servers 200-1, 200-2, 200-3, ..., 200-$s$, which communicate with one another over a network 220. The plurality of servers 200-1, 200-2, 200-3, . . . , 200-s include a combination of application servers and data storage servers for performing data computing and storage functions that support a social network application. It is to be understood that the computing system 200 shown in FIG. 2 may represent a single data center of a given social network provider, wherein the plurality of servers 200-1, 200-2, 200-3, . . . , 200-s represent a cluster of application and data storage servers within one data center facility. Alternatively, the computing system 200 shown in FIG. 2 may represent two or more or all data centers of a given social network provider, wherein the plurality of servers 200-1, 200-2, 200-3, . . . , 200-s represent the collection of clustered application and data storage servers within multiple data centers of the social network provider.

The network 220 may comprise, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed, so as to encompass a wide variety of different network arrangements, including combinations of multiple networks possibly of different types.

As shown in FIG. 2, the server 200-1 comprises a processing unit 202, network interface circuitry 204, storage interface circuitry 206, virtual machine(s) 208, system memory 210, and local storage 212. In addition, the server 200-1 comprises a data storage allocation and replication system 214/216 which comprises a data center ranking module 214 and a data allocation/replication management module 216. In one embodiment, the system components 214 and 216 comprise software programs that are loaded into the system memory 210 (from the local storage 212) and executed by the processing unit 202 to perform various functions, as will be explained in further detail below with reference to FIGS. 3A and 3B, for example. Furthermore, in one embodiment, the functionality of the system components 214 and 216 are distributed over multiple server nodes of the data centers, wherein some or all of the functionalities of the system components 214 and 216 execute on multiple server nodes to implement a distributed data storage allocation and replication system 214/216.

The processing unit 202 comprises one or more processors that are configured to process program instructions and data to execute a native operating system (OS) and application programs that run on the application server 200-1. The processing unit 202 comprises one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient, than is possible for executing such functions in software running on a more general purpose processor.

The network interface circuitry 204 enables the application server 200-1 to interface and communicate with a network and other system components. The network interface circuitry 204 may comprise conventional transceivers of a type well known in the art (e.g., network interface cards, I/O adaptors, etc.). The storage interface circuitry 206 enables the processing unit 202 to interface and communicate with the system memory 210, the local storage 212, and other off-infrastructure storage media, using one or more standard communication and/or storage control protocols to read data from or write data to volatile and non-volatile memory/storage devices (e.g., system memory 210 and local storage 212).

The virtual machine(s) 208 are implemented using a hypervisor platform which executes on the server 200-1. The virtual machines 208 can be instantiated to execute one or more functions of the data storage allocation and replication system 214/216, or other functions and applications, such as a social network application, which are hosted by the data center servers. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on the physical infrastructure, e.g., CPUs and/or storage devices, of the server 200-1. An example of a commercially available hypervisor platform that may be used to implement one or more of the virtual machines 208 to execute functions of the data storage allocation and replication system 214/216 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.).

The system memory 210 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 202 to execute a native operating system and one or more applications hosted by the application server 200-1, and to temporarily store data that is utilized and/or generated by the native OS and application programs running on the server 200-1. The local storage 212 comprises any type of non-voltage storage media including, but not limited to, HDD (hard disk drive) devices, Flash storage devices, disk storage devices, SSD (solid state drive) devices, or other types and combinations of non-volatile memory and associated drive types.

As noted above, in one embodiment, the data storage allocation and replication system 214/216 shown in FIG. 2 comprises software programs that may be stored in the local storage 212 and loaded into the system memory 210 for execution by the processing unit 202. In this regard, the system memory 210 and local storage 212 and other memory or storage media as described herein, which have program code tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

As explained further detail below, the data center ranking module 214 comprises methods that implement a data center ranking function to rank data centers within a social provider network. The data center ranking function is configured to identify a set of high ranking data centers within a given computing system of a social network which would be optimal for storing a primary copy and one or more replica copies of user data of a given user, in a manner that minimizes access latency of the user data of the given user by other users (e.g., friends) of the social network. The data allocation/replication management module 216 implements functions for allocating, storing, replicating, and migrating user data, as well as other management functions for storing and managing user data in storage nodes of data centers based on data center ranking information generated by the data center ranking module 214. Although not specifically depicted in FIG. 2, the server 200-1 hosts other applications/programs to implement functions associated with, e.g., a social network application.

It is to be understood that the other servers 200-2, 200-3, . . . , 200-s of the computing system 200 shown in FIG. 2 may have an architecture that is the same or similar to the architecture of the server 200-1 depicted in FIG. 2. The constituent components and modules of a given data center server can vary depending on whether the given server operates as an application server, a data storage server, or both. The computing system 200 shown in FIG. 2 may comprise additional known components such as batch processing systems, parallel processing systems, physical machines, virtual machines, virtual switches, storage volumes, logical units, etc. Again, the particular computing system shown in FIG. 2 is presented by way of example only, and the system 200 may include additional or alternative processing platforms, as well as numerous distinct processing platforms in any combination.

As noted above, embodiments of the invention include systems and methods for optimizing the storage allocation and replication of user data in data centers of a social network environment, which minimizes an average delay in accessing and reading the online data (e.g., pictures, posts, feeds, etc.) of other users in a social network. In a social network computing environment in which user data within the social network is stored in storage servers of various data centers located in different countries around the world, for example, various factors may be considered to determine an optimal data center location for storing primary and replica copies of the data of a given user so that friends of that user can access the user's data with minimal latency. For example, assume that a given user lives in Egypt and has many social network friends that live in the United States and some social network friends that live in Europe. Assume further that many of the social network friends of the given user who live in the United States frequently access the uploaded data, pictures, posts, etc. of the given user. In this example, considering that most of the user's friends live in the United States and these friends frequently access the user's data, from a viewpoint of minimizing access latency, it would be optimal to store the user's data in storage servers of a data center located in the United States. Indeed, while the user may live in Egypt and experience some latency in having his/her data uploaded and stored in a remote data center location in the United States, the access latency and network communication bandwidth associated with accessing the user's data is minimized as the user's data is stored in a data center location that is closest to a majority of the social network friends of the user who frequently access the user's data.

In accordance with embodiments of the invention, the data center ranking module 214 (FIG. 2), which executes on one or more servers in one or more data centers of the social network provider, implements a data ranking function to automatically rank each data center on a per user basis to determine an optimal data center location for storing data of a given user which minimizes access latency of the user's data by other users. In one embodiment of the invention, a data center ranking function is defined as follows:

$$\text{Rank}_u(DC_i) = \frac{\sum_{f_u=1}^{F_u(i)} R_{f,i}}{U_i}, \qquad \text{Eqn. (1)}$$

$$R_{f,i} = \frac{\text{number of reads by friend } (f)}{\text{number of data upload by user } (u)} \qquad \text{Eqn. (2)}$$

In the above Eqns. (1) and (2), the parameter u denotes a social network user ID, and the parameter i denotes a data center (DC) index number. Moreover, the parameter $f_u$ denotes a friend ID of a given user u, and the parameter $F_u(i)$ denotes a total number of friends (for a given user u) whose data is stored in a given datacenter i. The parameter $U_i$ denotes a total number of social network users whose data is stored in a given data center i. The parameter $R_{f,i}$ is referred to herein as a "reading ratio" (or access ratio) for a given friend fat a given datacenter i. In general, the term "reading ratio" (generally denoted as $R_f$) is a measure of a friend's interest in data that is shared by a given user u in the social network. The value of $R_f$ represents a ratio of the number of times a given friend $f_u$ (of a given user u) accesses/reads data that is shared/uploaded by the given user u (e.g., the user's uploaded data, pictures, posts, feeds, etc.) to the number of data uploads (e.g., uploaded data, pictures, posts, feeds, etc.) that the given user u has made to the social network.

The $\text{Rank}_u(DC_i)$ represents a ranking of a given datacenter i for a given user u. This ranking function is applied to rank each data center i of a social network provider on a per user basis. More specifically, in one embodiment of the invention, for a given user u, a rank is determined for a given data center i (via Eqn. (1)) by summing the determined reading ratio $R_f$ values of each of the user's friends $f_u$ whose data is stored in the given data center i, and then dividing the sum $$\left(\text{i.e., } \sum_{f_u=1}^{F_u(i)} R_{f,i}\right)$$

by $U_i$ for the given data center i. For example, if a given user u has five (5) friends whose social network data is stored in a given data center i (i.e., $F_u(i)=5$), the sum $$\sum_{f_u=1}^{F_u(i)} R_{f,i}$$

would be computed by adding the determined reading ratios $R_f$ of those five friends whose data is stored in a storage server of the given data center i. In this regard, the sum $$\sum_{f_u=1}^{F_u(i)} R_{f,i}$$

can be considered an "access ratio" that is determined as a ratio of (i) a number of times that each of a total number of users (friends) $F_u(i)$ in the given data center have accessed shared data of the given user u to (ii) a number of data uploads that the given user u has made to the computing system.

It is to be understood that with regard to the ranking function (Eqn. 1), the summation $$\sum_{f_u=1}^{F_u(i)} R_{f,i}$$

of the reading ratios is not just a measure of the number of a given user's friends having data stored in a data center—this sum takes into consideration the interest in the user's friends in reading the user's feeds. For example, a user may have a large number of friends whose social network data is stored in a given data center i, but if those friends are not interested in accessing the user's feeds, the data center should not be accorded a higher ranking or otherwise considered as a location for storing the user's data. By way of example, assume that a social network user who lives in the United States has a large number of friends whose data is located in a data center in the United States, and a relatively smaller number of friends whose data is located in a data center in Egypt. Assume further that very few of the user's friends in the United States access the user's feeds, while most of the user's friends in Egypt frequently access the user's feeds. In this scenario, it may be more optimal to store the user's social network data in a data center in Egypt (as compared to the United States) since the user's friends in Egypt more frequently access the user's social network feeds. Therefore, the ranking function generally accords a higher rank for storing the social network data of a given user in a given data center that is located close to where the user's friends reside, who show interest in accessing the user's data.

Moreover, while the summation $$\sum_{f_u=1}^{F_u(i)} R_{f,i}$$

of reading ratios takes into consideration a number of the user's friends in a given data center and their interest in accessing the user's feeds, in one embodiment of the invention, the ranking function of Eqn. (1) further takes into consideration load balancing issues by virtue of the parameter $U_i$. Indeed, if a given data center i is optimal for storing a user's data from the perspective of a large number of the user's friends in that data center who show interest in accessing the user's feeds, the given data center may be overloaded with a large number of users $U_i$ having data stored in the data center. Therefore, from a latency point of view, it may be more optimal to store the user's data in another less loaded data center which is located near that optimal, yet overloaded data center.

Figure 3A:
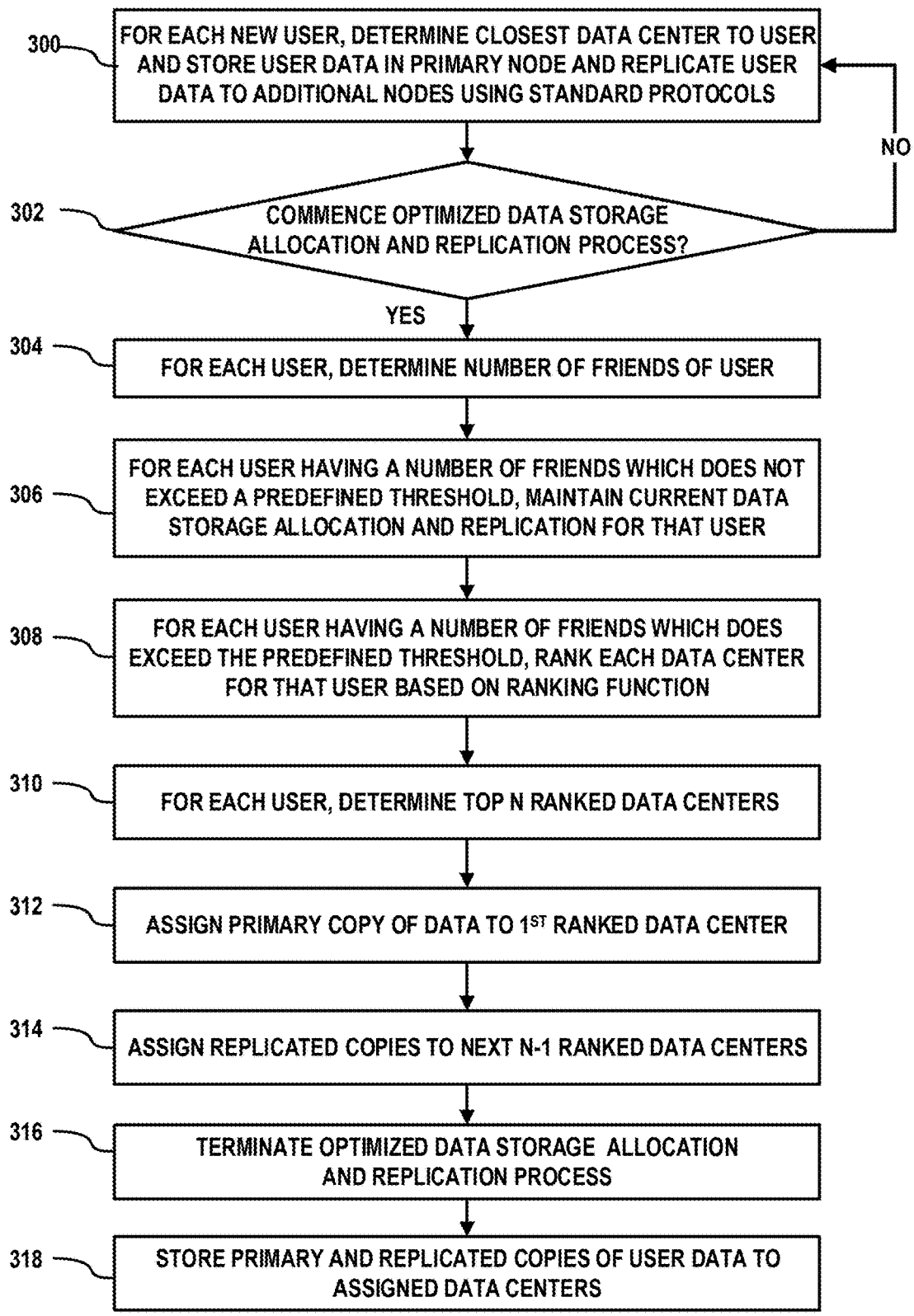
FIGS. 3A and 3B are flow diagrams that illustrate a method for optimizing storage allocation and replication of user data in data centers of a social network, according to an embodiment of the invention.
Figure 3B:
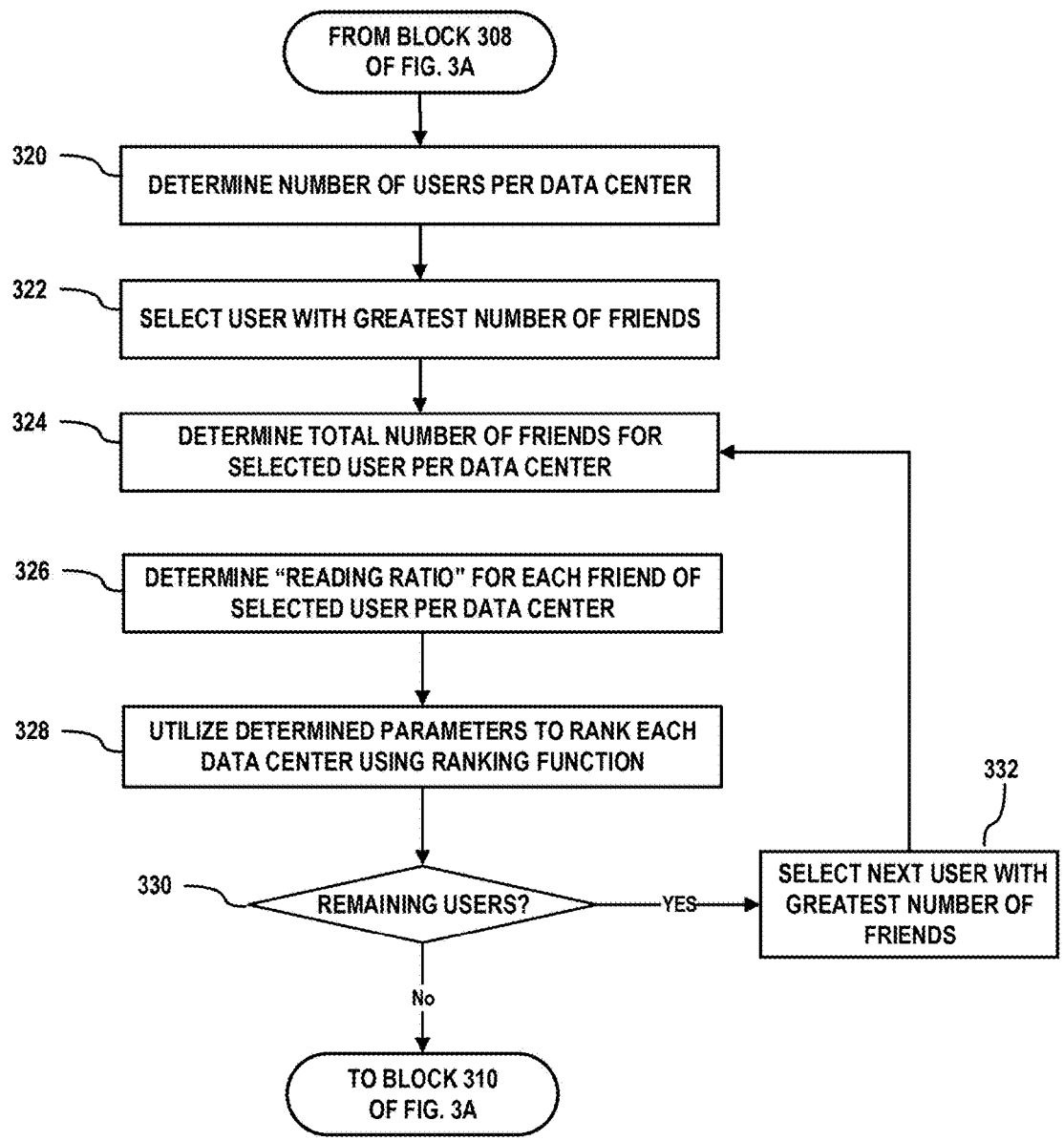

FIGS. 3A and 3B are flow diagrams that illustrate a method for optimizing storage allocation and replication of user data in data centers of an online social network, according to an embodiment of the invention. In one embodiment, the method of FIGS. 3A and 3B illustrate process steps that are implemented by the data storage allocation and replication system 214/216 shown in FIG. 2. In one embodiment of the invention, a method for optimizing storage allocation and replication of user data in data centers of an OSN is executed by the service provider of the OSN on a periodic basis (e.g., monthly, every M months, yearly, etc.) depending on the needs and desires of the given service provider, e.g., when it is known or assumed through historical context, for example, that a significant change has occurred in the social relationship of users of the OSN. In this regard, the time at which a data storage optimization process is performed by different OSN service providers will vary depending on the OSN service provider's understanding (through some analysis) about the growth and activity of the population of users for a given OSN, or when the OSN service provider wants to optimize and reallocate the user data based on some perceived event to thereby reduce access delay and enhance QoS (quality of service).

Referring to FIG. 3A, prior to performing a data storage allocation/replication optimization process, for each new user that joins a given OSN, conventional methods can be initially implemented to determine a primary data center (primary node), which is closest to the new user, in which to store a primary copy of the user's data in the OSN, as well as one or more secondary data centers (secondary nodes) which can be used to store one or more replica copies of the user's data (block 300). For example, conventional data storage management techniques that are used for social networks include, for example, Apache Cassandra, and Anycast routing. In addition, conventional storage replication techniques that are used for social networks include Cassandra Rack-Unaware and Cassandra Rack-Aware, for example.

In particular, the Anycast routing protocol is a "minimum-distance aware" algorithm that can be used to determine a closest data center to which a new user should be assigned. More specifically, for datacenter assignment, the Anycast routing algorithm is utilized to determine a closest datacenter to the user's location based on an IP mapping. Further, Apache Cassandra is an open source API which implements a consistent hashing algorithm for decentralized data storage management. With regard to data replication, Cassandra Rack-Unaware is a technique that relies on using successive nodes in a key ring for replication allocation. For example, FIG. 4 schematically illustrates a consistent hashing process for decentralized data storage management and data replication, which can be implemented in block 300 of FIG. 3A according to an embodiment of the invention.

Figure 4:
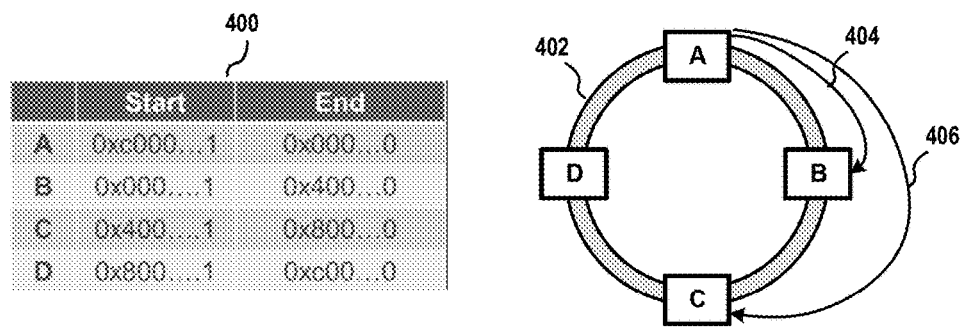
FIG. 4 schematically illustrates a consistent hashing process for decentralized data storage management and data replication, which can be implemented in block 300 of FIG. 3A according to an embodiment of the invention.

More specifically, as shown in FIG. 4, with consistent hashing, each user ID is processed using a MD5 hashing algorithm to generate a unique random code for each user. As shown in table 400 in FIG. 4, each node A, B, C, and D is assigned a range of key values. In the context of the embodiments discussed herein, each node A, B, C and D may represent a different data center of a given OSN. The user is assigned to a primary node A, B, C or D depending on which range of key values includes the MD5 code of the user. With regard to replication, successor nodes on a ring immediately following (in a clockwise direction) the primary node are selected to store a replica of the data depending on the replication factors. By way of example, with regard to data replication using the Rack-Unaware protocol, as shown in FIG. 4, assuming the replication factor is 3, if a given user is assigned node A as a primary node in the exemplary key ring 402, a replica copy 404 of the data will be stored in node B, and a replica copy 406 of the data will be stored in node C. It is to be appreciated that methods for optimization data storage allocation and replication according to embodiments of the invention as discussed herein provide less data read/access latency as compared to conventional methods such as Cassandra and Rack-Unaware.

Referring again to FIG. 3A, when the social network service provider determines that it is time to commence a storage allocation process to optimize storage allocation and replication of user data across the plurality of data centers of the OSN (affirmative determination block 302), the optimization process begins by launching the data center ranking module 214 (FIG. 2). The data center ranking process can be executed across a plurality of different servers in different geolocations so as to distribute the workload for storage allocation optimization and perform the process at certain times in the different geolocations where the social network is not loaded.

An initial step of the optimization process includes determining a number of friends of each user of the OSN (block 304). Then, for each user, a determination is made as to whether the number of friends for that user exceeds a predefined friend threshold ($F_{threshold}$). The value of this threshold will vary depending on the needs of the OSN provider and the impact of such parameter on the OSN performance and data allocation stability. For each user having a number of friends which does not exceed the predefined friend threshold ($F_{threshold}$) at that time, the current data storage allocation and replication for that user is maintained (block 306).

On the other hand, for each user having a number of friends which does exceed the predefined friend threshold, each data center in the OSN will be ranked for that user based on a data center ranking function (e.g., Eqn. (2)) as discussed above (block 308). This process will be described in further detail below with reference to FIG. 3B. For each user, the top N ranked data centers of the OSN will be determined (block 310) based on the ranking results generated in block 308. In one embodiment of the invention, N=3. A primary copy of the data of the user will be assigned to the first ranked data center (block 312), one or more replicated copies of the data of the user will be assigned to the next N−1 ranked data centers (block 314). For example, in one embodiment where N=3, the primary copy of user data will be assigned to the highest-ranked ($1^{st}$ ranked) data center, and a replica copy will be assigned to the $2^{nd}$ ranked data center, and a secondary replica copy of the user data will be assigned to the $3^{rd}$ ranked data center.

Once the data ranking process is complete for each user whose friend count exceeds the predefined friend threshold, the optimization process is terminated (block 316). Then, the data allocation and data replication management module 216 of FIG. 2 will proceed to store the primary and replica copies of the user data to the assigned data centers based on data center assignments/rankings generated and output as a result of the data optimization process (block 318). The primary and replica copies of the user data can be stored using suitable data migration and data mirroring techniques.

FIG. 3B is a flow diagram that illustrates a method for ranking the data centers for each user of the social network, whose friend count was determined to exceed the predefined friend threshold (in block 308), according to an embodiment of the invention. An initial step in the exemplary process is to determine a number of users per data center (block 320). As discussed above with regard to the data ranking function of Eqn. (1), this step determines the parameter $U_i$ for each data center, wherein $U_i$ denotes a total number of social network users whose data is stored in a given data center i. Then, starting with the user having the greatest number of friends (block 322), the process continues with determining a total number of friends of the selected user in each data center (block 324). As noted above, this step comprises determining the parameter $F_u(i)$, which denotes a total number of friends (for the selected user u) whose data is stored in a given datacenter i.

Next, for the selected user u, the "reading ratio" $R_f$ is determined for each friend $f_u$ of the user u in the social network (block 326). For example, in one embodiment of the invention, the "reading ratio" $R_f$ is determined using Eqn. (2) for each friend $f_u$ of the user u in the social network. As noted above, the reading ratio $R_f$ of a given friend $f_u$ of a given user u provides a measure of that friend's interest in the data that is shared by the given user u in the social network.

It is to be understood that the value of the parameter in the numerator of Eqn. (2) (i.e. number of reads by friend (f)) can be determined based on a number of times that shared data of the given user u was accessed by the given friend $f_u$ in some predetermined period of time prior to performing the storage optimization process. The predetermined period of time can be a month, a year, or the time period between performance of a previous storage optimization process and the current storage optimization process, or any other predetermined period of time. In another embodiment, the value of the parameter in the denominator of Eqn. (2) (i.e. number of data uploads by user (u)) can be determined based on a number of data uploads (e.g., uploaded data, pictures, posts, feeds, etc.) that the given user makes to the social network during the same predetermined period of time prior to performing the storage optimization process.

A next step in the exemplary process includes utilizing the determined parameters to rank each data center of the social network for the selected user, based on the ranking function (block 328). More specifically, in one embodiment of the invention, each data center of the social network is ranked, on a per user basis, using Eqn. (1) and the data computed for parameters $R_f$ and $U_i$. For the given selected user u, a rank is determined for a given data center i (via Eqn. (1)) by summing the determined reading ratio $R_f$ values of each of the user's friends $f_u$ whose data is stored in the given data center i, and then dividing the sum (i.e., $$\sum_{f_u=1}^{F_u(i)} R_{f,i}$$

by the determined value $U_i$ for the given data center i. The ranking process of block 328 is performed on a per user basis, so that each user u in the social network has set of ranked data centers associated therewith. As noted above, the ranking function is formulated such that for each user, a given data center i having the greatest number of friends of that user with high reading ratios, should have a higher ranking. In yet another embodiment of the invention, to take into consideration load balancing between the different data centers, the sum $$\sum_{f_u=1}^{F_u(i)} R_{f,i}$$

is divided by a total number of social network users $U_i$ whose data is stored in a given data center i. Thus, a data center having stored data of a smaller total number of social network users will have a higher ranking.

In another embodiment of the invention, other factors may be considered in selecting a high-ranking data center for storing a primary copy of the social network data of the given user u, as opposed to selecting the highest or top-ranked data center. For example, assume that for a given user u, a first data center has the highest ranking, and that a second data center has the next highest ranking, wherein the ranking values of the first and second data centers are very close. Assume further that the first (top-ranked) data center is geographically located further away from the given user u (i.e., the second data center is geographically located closer to the given user u). In this example, since the ranking values of the first and second data centers are very close, the second data center may be selected to store the social network data of the given user u as a way of minimizing the delay in uploading the user's data, while at same time taking into consideration a data center location that minimizes the latency of accessing such data by friends of the user.

Next, after the data center ranking process is completed with respect to the given user, if there are remaining users to process (affirmative determination in block 330), the user with the next highest number of friends is selected for determining the data center rankings for that user (block 332), and the process flow (blocks 324-328) is repeated for the newly selected user. Once all users are processed (affirmative determination in block 330), the process flow proceeds to block 310 (FIG. 3A) to process the data center ranking information of the users, and to assign primary and secondary data centers for storing primary and replica copies of the user data, as discussed above.

It is to be understood that depending on the population of social network users and their geographic locations, the friends of a given user may be located in only one data center, or distributed over two or more or all data centers of the social network. In this regard, one or more data centers of a social network may have a ranking of "0" for a given user. In this regard, for purposes of load balancing, although a given data center may be highly ranked for a given user, or although only one data center may have a rank, other factors can be considered in storing the user's data in a data center which has no ranking or a low ranking, but which is geographically close to the top-ranked data center.

To illustrate the advantages of rank-based storage allocation and replication techniques as discussed herein, computer simulations were performed to compare the performance of a rank-based storage allocation process according to an embodiment of the invention with several conventional storage allocation protocols that are currently implemented by current social networks. For instance, Facebook is a well-known social network that operates many data centers throughout the world. For purposes of managing distributed data across the various data centers, Facebook currently utilizes the known Apache Cassandra tool, in which data is distributed across nodes in a server cluster using a consistent hashing algorithm based on an order preserving hash function, as discussed above with reference to FIG. 4. Moreover, the social network Twitter currently uses the same algorithm (Apache Cassandra) for distributed storage and management of its data. Other social network providers such as Google utilize the Anycast protocol, which (as noted above) is a network addressing and routing protocol in which data from a sender is routed to a topologically nearest node in a group of potential receivers (e.g., requests are directed to nearest DNS server).

Computer simulations were performed using MATLAB to compare the performance of a rank-based storage allocation process according to an embodiment of the invention with a consistent hashing protocol (as used by Facebook) and a "closest datacenter" protocol in which the social network data of a given user is stored in a data center that is closest to the user. The computer simulations were configured to determine an average delay in accessing user data from data centers geographically distributed over the world (the results of which will be discussed below with reference to FIG. 4). As part of a problem formulation, delay calculations were performed based on the following delay formulas:

$$D_{u,f_u} = \frac{L_{u,i_{f_u}}}{V_{prop}} + T_{proc} \times U_i \qquad \text{Eqn. (3)}$$

$$Avg. \ D_u = \sum_{f_u=1}^{F_u} D_{u,f} \qquad \text{Eqn. (4)}$$

$$Avg. \ D = \sum_{u=1}^{U} Avr. \ D_u \qquad \text{Eqn. (5)}$$

In the delay formulations, the parameter $D_{u,f_u}$ denotes a delay between a given user u and a friend $f_u$ of the user. The parameter $L_{u,i_{f_u}}$ denotes a distance between a location of the given user u and a data center i that stores the data of the friend $f_u$. The parameter $V_{prop}$ denotes a signal propagation speed. The parameter $T_{proc}$ denotes a server transaction processing time. The parameter $U_i$ denotes the number of users in a given data center i. The parameter $F_u$ denotes a total number of friends of a given user u. The parameter Avg. $D_u$ denotes an average delay across all friends of the user u. The parameter Avg. D denotes an average delay for all users. The parameter U denotes a total number of users in the social network.

In addition, as part of the problem formulation, the following testing environment was defined for a social network. The population of data centers was defined to span an area of length=36,750 km, and a width=19,500 km, which values approximate the length and width of the world map. The total number of users U in the social network was a variable that was defined for 100, 500, 1000, 1,500 and 2,000 users. The population of users U was uniformly distributed over the defined area. The locations (X, Y) of the data centers were defined in the following table, wherein the values in the table were selected to simulate one data center located in each continent of the world.

| $X * 10^6$ | $Y * 10^6$ |
|---|---|
| 10.719 | 6 |
| 6.891 | 11.25 |
| 20.672 | 9.75 |
| 18.375 | 12.75 |
| 31.391 | 4.5 |
| 27.563 | 10.5 |
| 29.094 | 15 |

Figure 5:
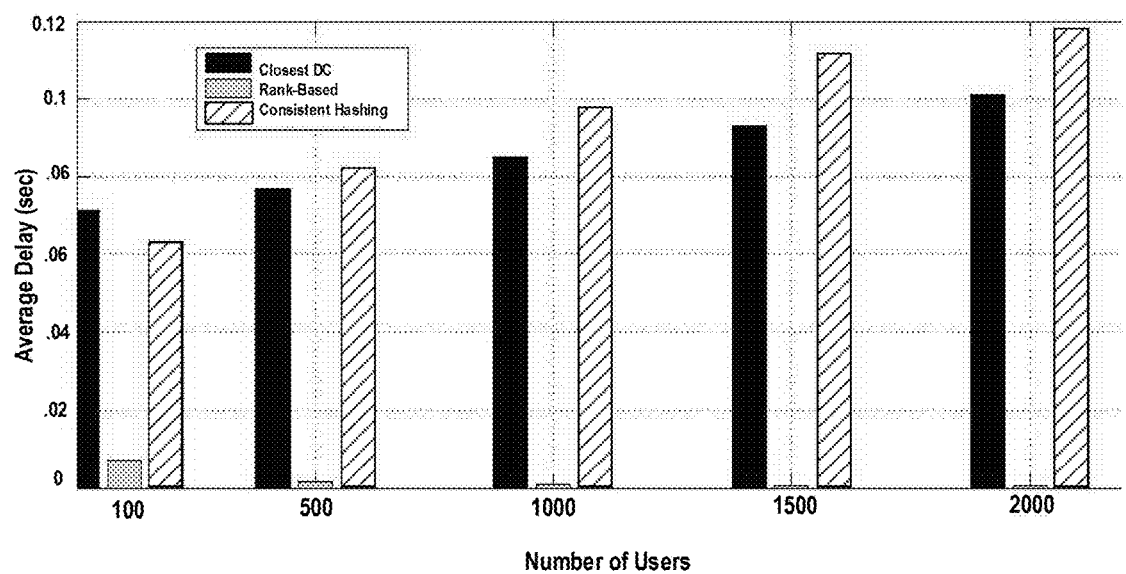
FIG. 5 is a graph that shows computer simulation results of average user delay in accessing data for different number of users between conventional storage allocation techniques and a ranking-based storage allocation and data replication technique according to an embodiment of the invention.

Furthermore, a friendship matrix was defined using a random distribution. The delay formulations and testing environment were defined and processed using MATLAB simulations, resulting in the performance test results shown in FIG. 5. In particular, FIG. 5 is a graph that shows computer simulation test results of an average user delay in accessing data over different size populations of users between conventional storage allocation techniques and a ranking-based storage allocation technique according to an embodiment of the invention. FIG. 5 compares the average user delay (in seconds) between a rank-based storage allocation process as described herein and a conventional consistent hashing and closest DC protocol. The simulation results in FIG. 5 show that a rank-based storage allocation process results in much less average user delay as compared to the conventional storage allocation protocols. Moreover, the test results in FIG. 5 show that with regard to a rank-based storage allocation method, the average delay in accessing user data decreases as the total number of users increases, whereas the average delay in accessing user data increases as the total number of users increases with the conventional storage allocation methods. The MATLAB test results of FIG. 5 indicate that it is not optimum, from an access delay point of view, to store user data based on consistent hashing or nearest DC protocols.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    storing user data in a plurality of data centers of a computing system, wherein the user data comprises shared data that is shared between users of the computing system; and
    performing a storage allocation and replication process to optimize storage of the user data in the data centers of the computing system, wherein performing a storage allocation and replication process comprises:
        determining a ranking of each data center in the computing system for at least one user of the computing system, wherein determining a ranking comprises ranking a given data center as a function of access ratio values of friends of the at least one user, whose data is stored in the given data center, wherein an access ratio value of a given friend of the at least one user comprises a ratio which is based at least in part on (i) a number of times that the given friend whose data is stored in the given data center has accessed the shared data of the at least one user and (ii) a number of data uploads of shared data that the at least one user has made to the computing system; and
        selecting a first data center to store a primary copy of user data of the at least one user, and selecting a second data center to store a replica copy of the user data of the at least one user, based at least in part on the determined rankings of the data centers for the at least one user, to reduce an average access delay experienced by the friends of the at least one user in accessing the shared data of the at least one user;
    wherein one or more of the storing and performing steps are performed under control of at least one processing device.

2. The method of claim 1, wherein selecting a first data center comprises selecting a highest ranked data center to store the primary copy of the user data, and wherein selecting a second data center comprises selected a next highest ranked data center to store the replica copy of the user data of the at least one user.

3. The method of claim 1, further comprising migrating the primary copy of the user data of the at least one user to the selected first data center of the computing system.

4. The method of claim 1, wherein the computing system comprises a social network.

5. The method of claim 1, wherein ranking a given data center further comprises dividing said access ratio by a total number of users having user data stored in the given data center.

6. The method of claim 1, wherein said number of times that the given friend whose data is stored in the given data center has accessed the shared data of the at least one user is based on a number of times that said shared data was accessed by the given friend in a given period of time prior to performing the storage allocation and replication process.

7. The method of claim 1, wherein storing user data in a plurality of data centers of a computing system comprises initially storing the user data of a new user in one of the data centers that is closest to the new user.

8. An article of manufacture comprising a non-transitory processor-readable storage medium having stored therein program code of one or more software programs, wherein the program code is executable by one or more processors to implement a method comprising:
    storing user data in a plurality of data centers of a computing system, wherein the user data comprises shared data that is shared between users of the computing system; and
    performing a storage allocation and replication process to optimize storage of the user data in the data centers of the computing system, wherein performing a storage allocation and replication process comprises:

determining a ranking of each data center in the computing system for at least one user of the computing system, wherein determining a ranking comprises ranking a given data center as a function of access ratio values of friends of the at least one user, whose data is stored in the given data center, wherein an access ratio value of a given friend of the at least one user comprises a ratio which is based at least in part on (i) a number of times that the given friend whose data is stored in the given data center has accessed the shared data of the at least one user and (ii) a number of data uploads of shared data that the at least one user has made to the computing system; and selecting a first data center to store a primary copy of user data of the at least one user, and selecting a second data center to store a replica copy of the user data of the at least one user, based at least in part on the determined rankings of the data centers for the at least one user, to reduce an average access delay experienced by the friends of the at least one user in accessing the shared data of the at least one user;

wherein one or more of the storing and performing steps are performed under control of at least one processing device.

9. The article of manufacture of claim 8, wherein selecting a first data center comprises selecting a highest ranked data center to store the primary copy of the user data, and wherein selecting a second data center comprises selected a next highest ranked data center to store the replica copy of the user data of the at least one user.

10. The article of manufacture of claim 8, further comprising migrating the primary copy of the user data of the at least one user to the selected first data center of the computing system.

11. The article of manufacture of claim 8, wherein the computing system comprises a social network.

12. The article of manufacture of claim 8, wherein ranking a given data center further comprises dividing said access ratio by a total number of users having user data stored in the given data center.

13. The article of manufacture of claim 8, wherein said number of times that the given friend whose data is stored in the given data center has accessed the shared data of the at least one user is based on a number of times that said shared data was accessed by the given friend in a given period of time prior to performing the storage allocation and replication process.

14. The article of manufacture of claim 8, wherein storing user data in a plurality of data centers of a computing system comprises initially storing the user data of a new user in one of the data centers that is closest to the new user.

15. An apparatus of a computing system, the computing system comprising a plurality of data centers for storing user data, wherein the user data comprises shared data that is shared between users of the computing system, the apparatus comprising:

a processor; and a memory coupled to the processor, wherein the memory comprises program instructions that are executed by the processor to perform a storage allocation and replication process to optimize storage of the user data in the data centers of the computing system, wherein the storage allocation and replication process comprises:

determining a ranking of each data center in the computing system for at least one user of the computing system, wherein determining a ranking comprises ranking a given data center as a function of access ratio values of friends of the at least one user, whose data is stored in the given data center, wherein an access ratio value of a given friend of the at least one user comprises a ratio which is based at least in part on (i) a number of times that the given friend whose data is stored in the given data center has accessed the shared data of the at least one user and (ii) a number of data uploads of shared data that the at least one user has made to the computing system; and selecting a first data center to store a primary copy of user data of the at least one user, and selecting a second data center to store a replica copy of the user data of the at least one user, based at least in part on the determined rankings of the data centers for the at least one user, to reduce an average access delay experienced by the friends of the at least one user in accessing the shared data of the at least one user.

16. The apparatus of claim 15, wherein selecting a first data center comprises selecting a highest ranked data center to store the primary copy of the user data, and wherein selecting a second data center comprises selected a next highest ranked data center to store the replica copy of the user data of the at least one user.

17. The apparatus of claim 15, wherein the memory further comprises program instructions that are executed by the processor to migrate the primary copy of the user data of the at least one user to the selected first data center of the computing system.

18. The apparatus of claim 15, wherein the computing system comprises a social network.

19. The apparatus of claim 15, wherein ranking a given data center further comprises dividing said access ratio by a total number of users having user data stored in the given data center.

20. The apparatus of claim 15, wherein said number of times that the given friend whose data is stored in the given data center has accessed the shared data of the at least one user is based on a number of times that said shared data was accessed by the given friend in a given period of time prior to performing the storage allocation and replication process.

* * * * *